United States Patent [19]

Sogge

[11] 4,069,856  
[45] Jan. 24, 1978

[54] CRAWLER-TYPE VEHICLE WHEELS HAVING IMPACT ABSORBING RIMS WITH RESILIENT BIASING MEANS

[75] Inventor: John W. Sogge, Cedar Rapids, Iowa

[73] Assignee: Caterpillar Tractor Co., Peoria, Ill.

[21] Appl. No.: 712,567

[22] Filed: Aug. 9, 1976

[51] Int. Cl.² .................................................. B62D 55/12
[52] U.S. Cl. ...................................... 152/27; 152/47; 305/21; 305/57
[58] Field of Search ............... 305/21, 24, 28, 5, 57, 305/56; 301/51; 152/21, 22, 27, 47, 52

[56] References Cited

U.S. PATENT DOCUMENTS

| 747,343 | 12/1903 | Ahlquist | 152/22 X |
| 993,043 | 5/1911 | Dudley | 152/22 |
| 1,107,916 | 8/1914 | Denis | 152/27 |

FOREIGN PATENT DOCUMENTS

| 46,504 | 4/1936 | France | 152/27 |

Primary Examiner—Robert B. Reeves  
Assistant Examiner—John P. Shannon  
Attorney, Agent, or Firm—Frank L. Hart

[57] ABSTRACT

Wheels of a crawler-type vehicle have rims that are laterally movable relative to the axis in response to a force subjected on the rim. The rim is biased by resilient material to return to its normal position in response to removal of the force on the rim.

7 Claims, 8 Drawing Figures

U.S. Patent    Jan. 24, 1978    Sheet 1 of 2    4,069,856
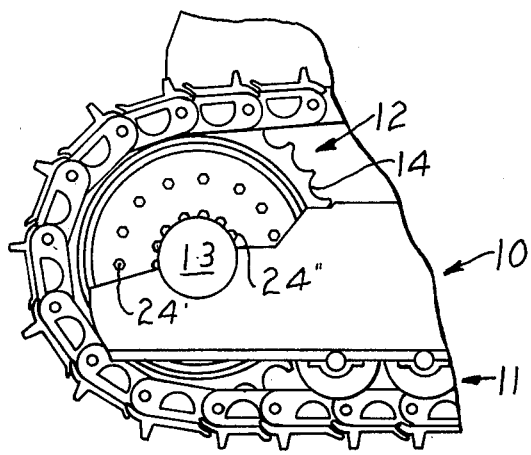
Fig_1_
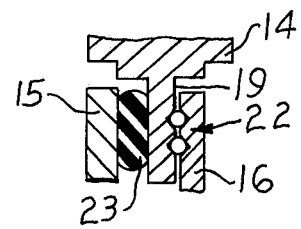
Fig_3_
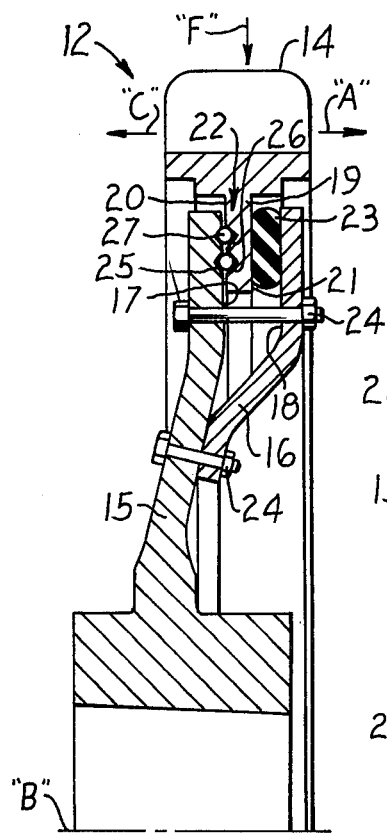
Fig_2_
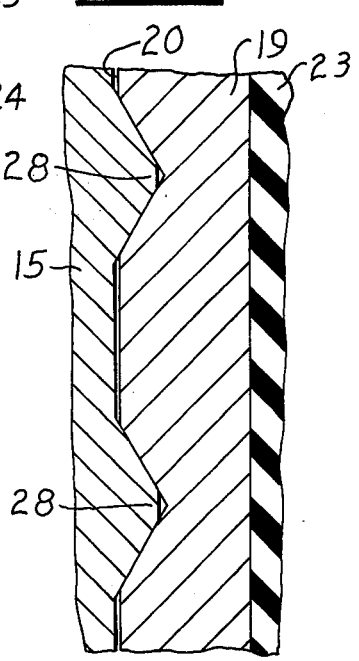
Fig_4_
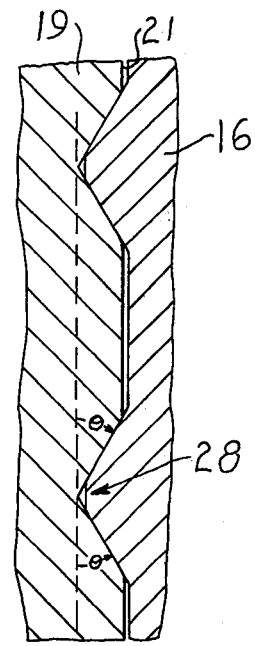
Fig_5_

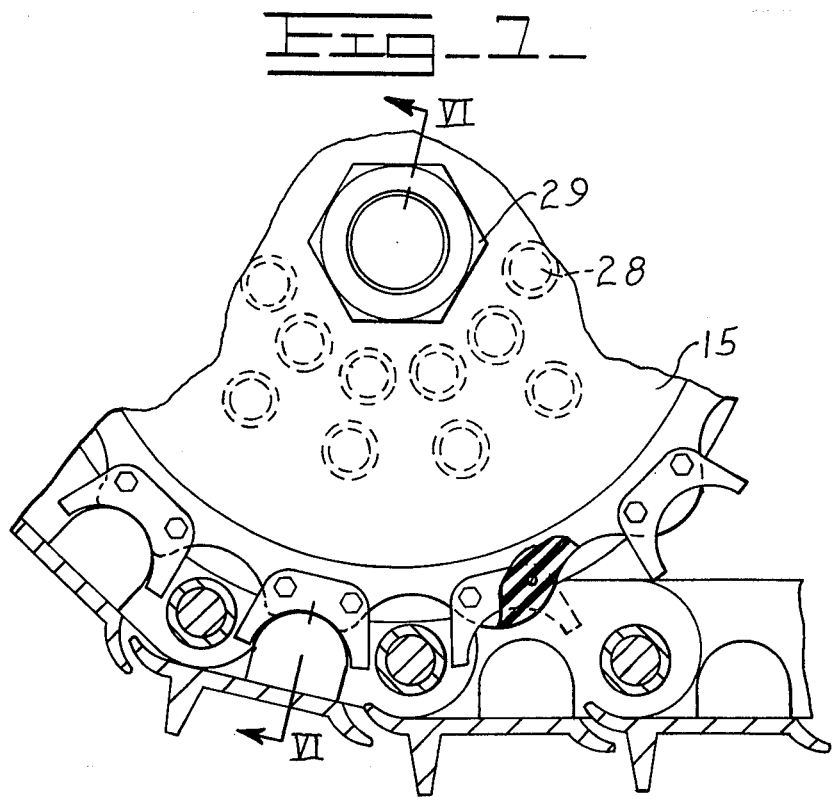
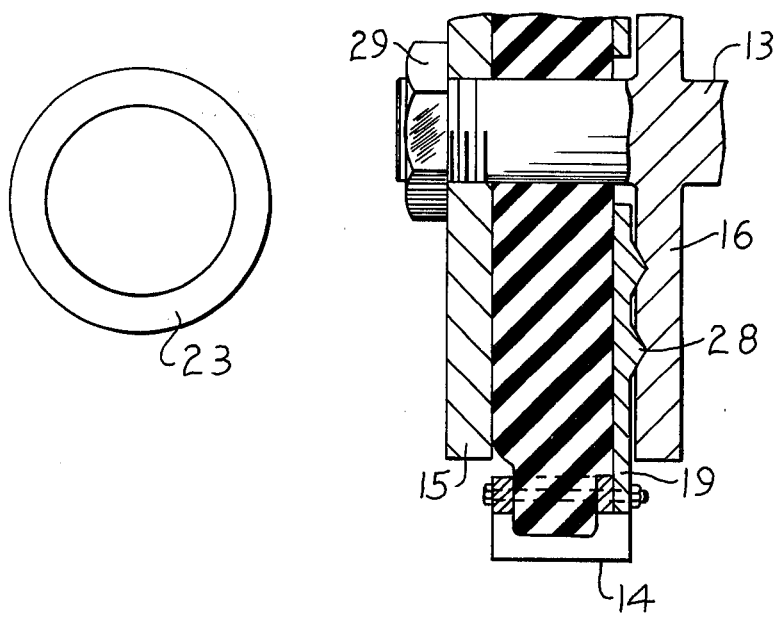

CRAWLER-TYPE VEHICLE WHEELS HAVING IMPACT ABSORBING RIMS WITH RESILIENT BIASING MEANS

BACKGROUND OF THE INVENTION

During operation of a crawler-type vehicle, the continuous tread sometimes impacts the supporting and drive wheels with a force sufficient to generate undesirable damage and promote wear and noise. This invention therefore resides in apparatus for cushioning forces subjected onto the wheel rim by providing for lateral movement of the rim into contact with biasing means in response to forces subjected onto the rim.

BRIEF DESCRIPTION OF THE DRAWINGS

FIG. 1 is a diagrammatic side view of a portion of a work vehicle having the apparatus of this invention;

FIG. 2 is a diagrammatic view in partial section of a portion of one embodiment of the wheel of this invention;

FIG. 3 is a diagrammatic sectional view of a portion of another embodiment of the wheel of this invention;

FIG. 4 is a diagrammatic sectional view of a portion of another embodiment of the wheel of this invention;

FIG. 5 is a diagrammatic sectional view of a portion of another embodiment of the wheel of this invention;

FIG. 6 is a diagrammatic sectional view of a portion of another embodiment of the wheel of this invention;

FIG. 7 is a diagrammatic side view of a work vehicle having the apparatus of FIG. 6; and FIG. 8 is a diagrammatic side view of the second means of this invention.

Detailed Description of the Invention

Referring to FIG. 1, a crawler-type work vehicle 10, such as a crawler tractor, has continuous treads 11 that are driven by a sprocket wheel 12 and supported by a plurality of other wheels (not shown) as is known in the art.

Referring to FIG. 2, the wheels 12 have a hub 13, a rim 14, and first and second spaced apart panels 15,16 for connecting the hub to the rim.

One of the panels is connected to the hub 13 and the other panel is connected to the panel which is connected to the hub. FIG. 2 shows the first panel 15 connected to the hub 13. Each of the panels 15,16 have an inner surface 17,18.

A holding element 19 having first and second opposed sides 20,21 extends generally radially from the rim 14 to a preselected location between the panels 15,16. The holding element 19 can be a continuous flange extending from the rim 14 or a plurality of arcuately spaced apart flanges.

A first means 22 is provided for biasing the rim holding element 19 in a first direction, shown by arrow "A", that is generally parallel to the axis "B" of the hub 13 in response to a force "F" of a preselected magnitude being subjected onto the rim 14 in a direction toward the hub 13.

A second means 23 is provided for biasing the rim holding element 19 in a second direction, shown by arrow "C". The second direction "C" is opposed to said first direction and generally parallel to the axis "B" of the hub 13. This second means 23 is preferably a deformable resilient element such as rubber, for example.

The panel 15 or 16 is connected to or supported by the other respective panel 16,15, and is preferably of a construction sufficient for spacing said panel from the hub, as shown with respect to the second panel 16 of FIG. 2, and said shorter second panel 16 is connected to the first panel 15 by a plurality of spaced apart bolts 24. As better seen in FIGS. 1 and 7, a first portion of the bolts 24' is preferably positioned at a location closer to the hub 13 than a second portion of the bolts 24'.

FIG. 2 shows one embodiment of the first means 22. In this embodiment, a plurality of seats 25 is formed on the first panel 15 at arcuately spaced apart locations about the hub 13. Here, there are two concentric rows of seats formed on the first panel 15. A plurality of matching seats 26 are formed on the adjacent side 20 or 21 of the holding element 19 adjacent respective seats 25 of the immediately adjacent panel 15. A plurality of rolling elements 27, for example ball bearings, are each positionable in adjacent first and second seats 25,26 of the immediately adjacent panel 15 and holding element 19.

FIG. 2 shows seats 25 on the first panel and cooperating seats 26 on the first side 20 of the holding element 19. FIG. 3 shows seats 25 on the second panel and cooperating seats 26 on the second side 21 of the holding element 19. In either embodiment, the second means 23 is positioned in the annulus on the opposed side of the holding element 19 from said first means 22.

FIGS. 4 and 5 show another embodiment of the apparatus of this invention wherein protrusions 28 extend outwardly from one of the panels 15 or 16 or holding element 19 for mating with seats 25 or 26 of the immediately adjacent panel 15 or 16 or holding element 19. FIG. 4 shows the protrusions 28 extending outwardly from the first panel 15 and mating with respective seats 26 of the first side 20 of the holding element 19. FIG. 5 shows protrusions 28 extending outwardly from the second panel 16 and mating with respective seats 26 of the second side 21 of the holding element 19 and FIG. 6 shows the protrusions 28 extending outwardly from the holding element 19 and mating with respective seats 25 of the immediately adjacent panel 15 or 16, here panel 16. As with respect to the embodiments of FIGS. 2 and 3, where the first means 22 have protrusions 28, the second means 23 is positioned in the annulus on the opposed side of the holding element 19 from said first means 22. The protrusions 28 and mating seats 25 can be of conical or other configuration.

The second means 23 is preferably of ring configuration, as shown in FIG. 8, but can be constructed differently without departing from this invention.

Referring to FIG. 6, both panels 15,16 are connected to the hub 13. Nut 29 is provided for controllably moving one of the panels, here panel 15, into forcible contact with the second means 23 for preloading the second means 23.

In the embodiment of FIG. 2, bolts 24 are utilized for preloading the second means 23.

In the operation of this invention, when a force "F" at or above a preselected magnitude is subjected onto the rim 14 in a direction toward the hub 15, a portion of the rim 14 is controllably moved in a direction generally toward the hub 13. Movement of the rim 14 toward the hubs causes the holding element 19 to also move and the first means 22 causes the holding element 19 to be biased generally in direction "A" in response thereto. Movement of the holding element 19 in direction "A" causes the second means 23 to be compressed which results in providing a reactive force against the holding element 19 which is directed in the opposed direction "C". This reactive force generated by the second means 23 functions to bias the rim 14 toward the normal position and reduce noise resulting from the impact of the force "F".

Other aspects, objects, and advantages of this invention can be obtained from a study of the drawings, the disclosure, and the appended claims.

What is claimed is:

1. A track wheel for a crawler-type tractor comprising:
   a hub;
   a rim spaced a preselected distance from the hub;
   first and second spaced apart panels for connecting the hub to the rim, said second panel being connected to the first panel and spaced from the hub;
   a holding element having first and second opposed sides and extending from the rim to a preselected location between the panels;
   first means for biasing the rim holding element in a first direction generally parallel to the axis of the hub in response to a force of a preselected magnitude being subjected onto the rim in a direction toward the hub while generally maintaining said rim said preselected distance from the hub at the location where the force is applied; and
   second means for biasing the rim holding element in a second direction, said second direction being opposed to said first direction and generally parallel to the axis of the hub, said second means being a preloaded deformable resilient elastomeric element.

2. Apparatus, as set forth in claim 1, wherein the first means comprises:
   a plurality of seats formed on one of the inner surfaces of a panel, the first side of the holding element and the second side of the holding element;
   a plurality of protrusions formed on the other immediately adjacent one of said panel, first and second sides of the holding element, said protrusions being positioned at locations for mating with the adjacent seats.

3. Apparatus, as set forth in claim 1, wherein the first means comprises:
   a plurality of first seats formed on one of the inner surfaces of a panel, the first side of the holding element, and the second side of the holding element;
   a plurality of second seats formed on the other immediately adjacent one of said panel, first and second sides of the holding element, said second seats being positioned at locations for mating with the adjacent first seats;
   a plurality of rolling elements, each positionable in adjacent first and second seats of the holding element and immediately adjacent panel.

4. Apparatus, as set forth in claim 3, wherein the rolling elements are each ball bearings.

5. Apparatus, as set forth in claim 1, wherein the second means is of a ring configuration.

6. Apparatus, as set forth in claim 1, wherein the second means is formed of rubber.

7. Apparatus, as set forth in claim 1, wherein said panels are connected by a plurality of bolts with a first portion of the bolts being positioned closer to the hub than another portion of the bolts.

* * * * *